P. E. GROSS.
ARTIFICIAL FISHING BAIT.
APPLICATION FILED JAN. 29, 1921.
1,430,642.
Patented Oct. 3, 1922.
3 SHEETS—SHEET 3.
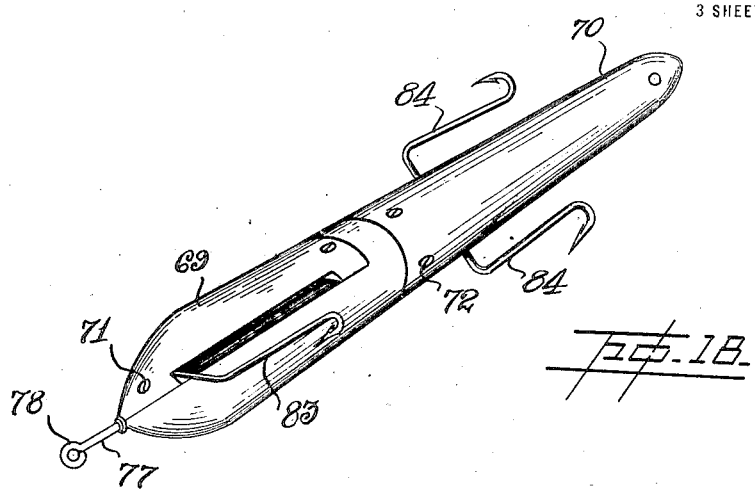
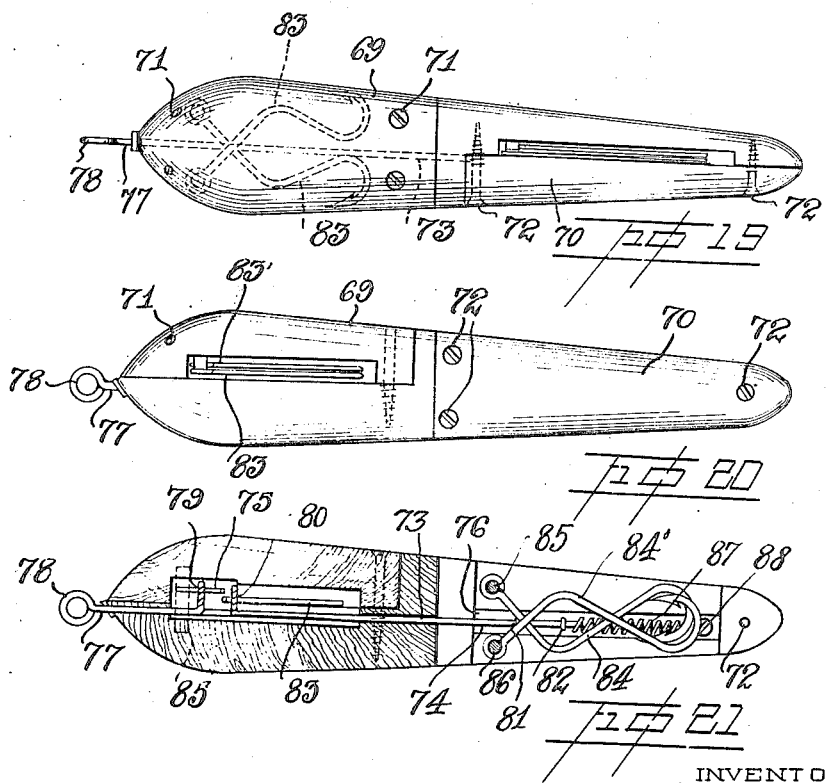
INVENTOR
Phillip E. Gross
BY
ATTORNEY
E. H. Bond Patented Oct. 3, 1922.

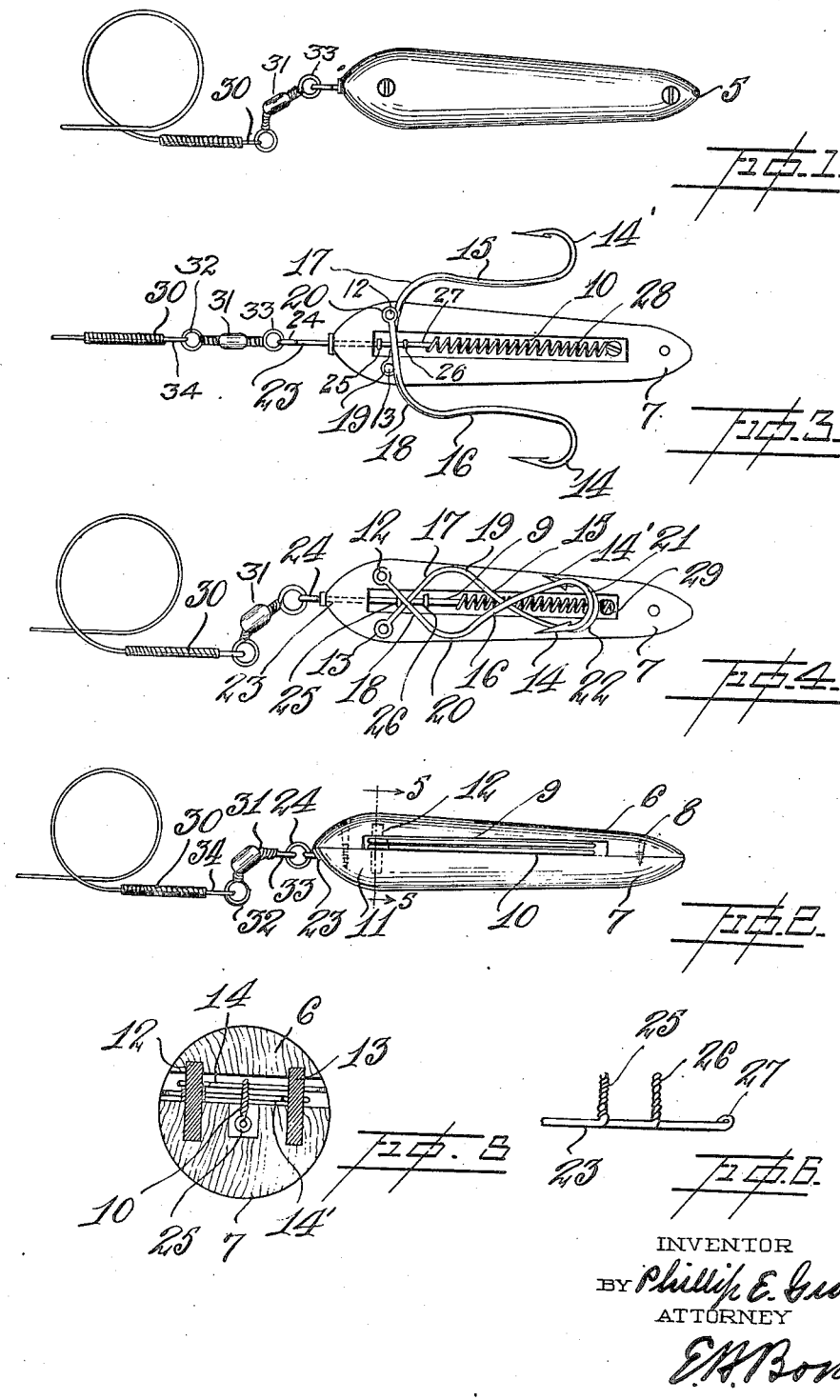

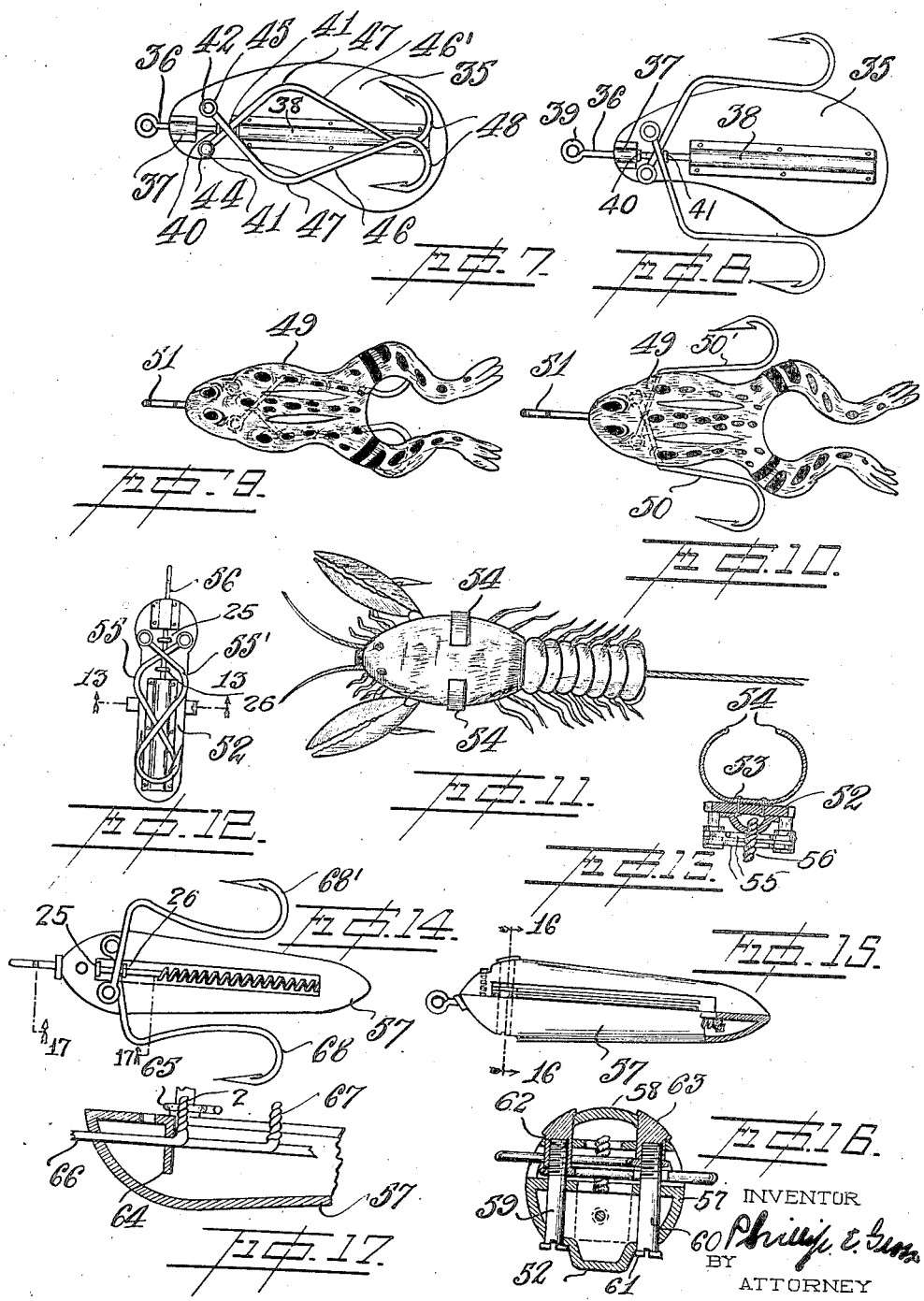

1,430,642

UNITED STATES PATENT OFFICE.

PHILLIP E. GROSS, OF OTTAWA, ONTARIO, CANADA.

ARTIFICIAL FISHING BAIT.

Application filed January 29, 1921. Serial No. 440,950.

*To all whom it may concern:*

Be it known that I, PHILLIP E. GROSS, a citizen of the United States of America, residing at Ottawa, in the county of Carleton and Province of Ontario, Canada, have invented certain new and useful Improvements in Artificial Fishing Bait, of which the following is a specification.

The present invention relates to improvements in artificial fishing bait and the principal object is to produce a device of the character described, which will prevent accumulation of grass or weeds upon the hooks carried thereby.

Another object of the invention is to provide a novel bait, provided with automatically operable hooks, adapted to be normally disposed within the casing of the bait.

A further object of the invention is to provide a bait with concealed hooks, adapted to be extended upon the strike of the fish.

With these and other objects in view, the invention consists in the construction, combination and arrangement of parts as will be hereinafter fully described, illustrated in the accompanying drawings, and pointed out in the claims hereunto appended.

Figure 1 is a plan elevation of the invention in the form of a wooden or fibre minnow or plug.

Fig. 2 is a side elevation of the same.

Fig. 3 is a plan elevation with the upper section removed, illustrating the hooks in extended position.

Fig. 4 is a similar view, illustrating the normal position of the hooks.

Fig. 5 is a transverse vertical section on on line 5—5 of Fig. 2, looking in the direction of the arrows.

Fig. 6 is a fragmental detail of the operating rod for the hooks.

Fig. 7 is an elevational view of a modification in the form of a spoon or spinner bait illustrating the normal position of the hooks.

Fig. 8 is a similar view, illustrating the hooks in distended position.

Fig. 9 is an elevational view, another modification in the form of a frog bait, illustrating the normal position of the hooks.

Fig. 10 is a similar view, illustrating the distended position of the hooks.

Fig. 11 is an elevational view of an interchangeable bait holder, illustrating the attachment of a craw-fish or dobson thereto.

Fig. 12 is a bottom plan view of the bait holder.

Fig. 13 is a magnified transverse vertical section on line 13—13 of Fig. 12.

Fig. 14 is a plan elevation of a metallic minnow or plug, with the upper section removed.

Fig. 15 is a side elevation of the same, with a portion broken away and in section to illustrate the tension spring.

Fig. 16 is a vertical section of Fig. 15 on line 16—16 looking in the direction of the arrows.

Fig. 17 is a fragmental vertical section on line 17—17 of Fig. 14, illustrating a portion of the hook shifting element.

Fig. 18 is a perspective view of a still further modification, illustrating a minnow or plug bait constructed of wood and provided with multiple hook units, illustrating the hooks in distended position.

Fig. 19 is a plan elevation of the same, with the hooks in closed position.

Fig. 20 is a side elevation, and

Fig. 21 is a longitudinal section of Fig. 19.

Referring to the drawings like numerals designate like parts in the various drawings.

The principal objection encounted in the use of artificial bait is the tendency of the hooks to attach themselves to river grass and weeds during the casting and retrieving operation and with the object of obviating this defect, I have provided an artificial bait, wherein the hook elements are normally disposed within the body or casing of the same.

In the preferred form of the invention illustrated in Figures 1 to 6 inclusive the numeral 5 designates a wooden or fibre minnow or plug, formed with upper and lower sections 6 and 7 attached together by screws 8.

Sections 6 and 7 are formed with registering longitudinal recesses 9 and 10 and likewise section 7 is formed with a bore 11, which communicates at its inner end with the recess 10. A pair of pins 12 and 13 are disposed in apertures in the enlarged end of the bait casing 5. A pair of hooks 14 and 14' are formed with relatively long shanks 15 and 16 of semi-arcuate configuration, which at their upper ends are bent upward and extend outwardly at an angle to the shank portions 15 and 16 as at 17 and 18. The angular ends 17 and 18 of the hooks terminate in the eyelets 19 and 20. Hook 14 is pivotally connected to pin 12, while hook 14' is pivotally connected to pin 13. In normal position hooks 14 and 14' are disposed entirely within the casing 5 and for the accomplishment of this novel arrangement, I cross the angular end 18 of hook 14 over the angular end 17 of the hook 14'. In this position the curved portions 19 and 20 of the hooks will be located oppositely and the lower curved portion 21 of hook 14 will be disposed over the lower curved end portion 22 of hook 14', as clearly illustrated in Fig. 4.

A wire member 23 having an eyelet 24 formed on its outer end, is slidably mounted in the bore 11 of lower casing section 7, while its inner end projects within the recess 10 of said section. This wire member 23 intermediate its ends is twisted to form the vertically extending spaced apart pins 25 and 26, while the inner end of said wire member is bent over at 27 and connected to one end to the retractile spring 28.

This spring 28 is likewise disposed in recess 10 of the casing section 7 and its inner end is connected to the said section by a screw 29. The angularly disposed portions 17 and 18 of the hooks at their point of intersection are disposed between the pins 25 and 26, so that when the wire member 23 is pulled outwardly against the tension of the retractile spring 28, the pin 26 will engage the intersecting portions of the said hooks. Resultantly hooks 14 and 14' are moved outwardly on their pivots 12 and 13 and when fully extended assume the position illustrated in Fig. 3. In this position the hooks have attained their greatest degree of adjustment and further expansion in this direction is limited by the pin 26. The bait as illustrated is attached to a line 30 by a connecting link 31 having rings 32 and 33 which connect to a loop 34 of the line and eyelet 24 of the wire 23. In operation when a strike is made, the fish has swallowed the bait, and offers resistance by reason of its weight and fighting propensities, and resultantly as the line is pulled taut, the wire member 23 connected thereto, operates against the tension of spring 28 and pin 26 is drawn into engagement with the intersected portions 17 and 18 of the hooks 14 and 14'. As the hooks 14 and 14' swing on their pivots 12 and 13, the sharp pointed ends penetrate the walls of the mouth of the fish. The more the fish fights the landing, the further the hooks are extended, and meanwhile the line is being kept taut by the angler, which precludes the rearward movement of the wire member 23 to withdraw the hooks within the casing 5. When the fish has been landed and removed from the bait, the spring 28 will tension the wire member 23 inwardly and pin 25 forces against the opposite intersecting portions 17 and 18 of the hooks and returns the same to normal position as illustrated in Fig. 4.

In the modification illustrated in Figs. 7 and 8, the spoon 35 is swiveled on the wire member 36, journaled and slidably mounted in the short and long straps 37 and 38. This wire member 36 is formed at one end with an eyelet 39 by which it is connected to the line and is likewise formed with two vertical pins 40 and 41. Studs 42 and 43 are connected to the outer end of spoon 35, on which are mounted the ring ends 44 and 45 of hooks 46 and 46'. These hooks intermediate their ends are bent outwardly in opposite directions as at 47 and have the portions adjacent their pivots 42 and 43 crossed or intersected. The intersected portions of the hooks are disposed between the pins 40 and 41 on the wire member 36 and the lower bowed portions 48 slightly overlap and are completely covered by the enlarged end of the spoon. This spoon 35 revolves on wire member 36 in the usual manner and the hooks are operable in a similar manner as disclosed in the preferred form.

In the modification illustrated in Figs. 9 and 10, I employ a bait in the form of an artificial frog 49, which latter is provided with a centrally disposed channel and bore in which are mounted the hooks 50 and 50' and the wire member 51. This wire member is attached to the line and is constructed and operated similar to the wire members 23 and 36 of the other forms. This bait may be formed of rubber or metal moulded or formed in sections.

In the modification illustrated in Figs. 11, 12 and 13, I provide a live bait holding device comprising a flat piece of metal 52 to which is attached by rivets 53 the spring steel member 54. The hooks 55 and 55' are connected to the lower side of plate 52 and are connected to a wire member 56. The hooks in this form are of the same configuration and operate in a similar manner as those of the preferred form. The live bait preferably crawfish, is tightly held within the arms of the spring steel member 54. It is likewise obvious that other kinds of hard shell bait may be similarly held upon the device.

In the modification illustrated in Figs. 14 to 17, inclusive, a metallic minnow or plug is illustrated formed of sections 57 and 58 connected together by bolts 59 and 60. The section 57 is pressed inwardly at each lower side to form seats for the bolts 59 and 60 having heads 61 and the upper threaded ends 62 take into the plugs 63. These plugs have semi-arcuate outer surfaces. In this form, during the stamping operation to produce these sections, the metal at the upper end of the casing is struck inwardly to form a lip 64 as illustrated in Fig. 17, and said lip acts as a stop for the pin 65 of wire 66. Wire 66 is also formed with a pin 67 which acts as the medium for actuating the hooks 68 and 68' and these hooks will normally be entirely enclosed by the casing.

In the embodiment of my invention illustrated in Figures 18 to 21 inclusive, I provide a bait in the form of a wooden minnow or plug of segmental construction. This bait casing is cut away on its upper forward surface and its lower end surface and segments 69 and 70 are attached thereto by screws 71 and 72.

The forward part of the casing is provided with a bore 73, which communicates with a counter-bore 74 in the opposite end. The segments 69 and 70 are formed with recesses 75 and 76 and the wire member 77 is operable in bore 73 and recesses 75 and 76. The forward part of the wire member 77 is formed with an eyelet 78 adapted for connection to the line and said wire is twisted adjacent its opposite end to form the pins 79 and 80 and 81 and 82.

Hooks 83 and 83', 84 and 84' disposed in the recesses 75 and 76 of segments 69 and 70 and are mounted on the pins 85 and 86. The wire member 77 is connected at its inner end to a retractile spring 87 secured to the casing by a screw 88. Hooks 84 and 84' are operable by the wire pins 79 and 80 and 81 and 82 substantially the same as in the other forms described.

It is obvious that as the hooks are enclosed in the bait casing the same will not be exposed to cause entanglement with grass or weeds.

From the foregoing it is thought that the construction of my invention will be clearly understood, and, therefore, a more extended explanation has been omitted.

Having thus described my invention what I claim as new is:—

1. An artificial bait comprising a casing, pivoted hooks in said casing, disposed in crossed relation adjacent their pivots, and having oppositely curved portions intermediate their length also crossed, and spaced-apart projections one of which is normally out of engagement with but engageable with said hooks adjacent their pivots actuating the hooks.

2. An artificial bait comprising a casing, pivoted hooks in said casing disposed in crossed relation adjacent their pivots, and having oppositely curved portions intermediate their length also crossed, spaced-apart projections one of which is normally out of engagement with but engageable with said hooks adjacent their pivots actuating the hooks, and a spring for moving said means in one direction.

3. An artificial bait comprising a casing, pivoted hooks in said casing disposed in crossed relation adjacent their pivots, and having oppositely curved portions intermediate their length also crossed, spaced-apart projections one of which is normally out of engagement with but engageable with said hooks adjacent their pivots actuating the hooks, a spring for moving said means in one direction, and a line for moving said means in the other direction against the tension of said spring.

4. An artificial fish bait comprising a casing, hooks pivotally mounted in said casing, a member slidable in said casing, said member adapted for connection to a fishing line, spaced-apart pin projections formed on said member one of which is normally out of engagement with the hooks and adapted for engagement with said hooks for actuating the same outwardly of said casing and back to normal position within said casing and the said hooks adapted for actuation by the strike of a fish.

5. An artificial fish bait comprising a casing formed in sections, pins arranged in said casing hooks movable on said pins, a wire member operable in said casing, said member adapted for connection to a fishing line and being formed with pin projections, a spring mounted in said casing and having one end connected to said wire member, one of said pins normally out of contact with the hooks and said pins being spaced apart and adapted for engagement with said hooks to extend the same outwardly of said casing and the other of said pins being associated with said spring for returning the hooks to normal position within said casing.

6. A device of the character described comprising a casing, pins arranged in said casing, hooks pivotally mounted on said pins, a member slidably mounted in said casing, pins formed on said member, one of said pins adapted for engagement with said hooks, said member adapted for connection to a line, a spring connected to said slidable member, said hooks adapted for movement outwardly of said casing and a clasp member for holding live bait thereon.

7. A device of the character described comprising a casing, pins arranged in said casing, hooks pivotally mounted on said pins, a member slidably mounted in said casing, pins formed on said member, one of said pins adapted for engagement with said hooks, said member adapted for connection to a line, a spring connected to said slidable member, said hooks adapted for movement outwardly of said casing, a clasp member for holding live bait thereon, and a member associated with the actuating, and means for returning the hooks to normal position with said casing.

In testimony whereof I affix my signature in the presence of two witnesses.

PHILLIP E. GROSS.

Witnesses:
M. McMILLAN,
W. PENDLETON.